(12) United States Patent  
Bulteel et al.

(10) Patent No.: US 10,291,895 B2  
(45) Date of Patent: May 14, 2019

(54) TIME OF FLIGHT PHOTOSENSOR

(71) Applicant: OMNIVISION TECHNOLOGIES, INC., Santa Clara, CA (US)

(72) Inventors: Olivier Bulteel, San Jose, CA (US); Rui Wang, San Jose, CA (US); Zheng Yang, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 136 days.

(21) Appl. No.: 15/333,653

(22) Filed: Oct. 25, 2016

(65) Prior Publication Data

US 2018/0115762 A1  Apr. 26, 2018

(51) Int. Cl.
| | |
|---|---|
| H04N 7/00 | (2011.01) |
| H04N 13/122 | (2018.01) |
| H04N 13/254 | (2018.01) |
| G01S 3/00 | (2006.01) |
| G01B 11/24 | (2006.01) |

(52) U.S. Cl.
CPC .......... *H04N 13/122* (2018.05); *G01B 11/24* (2013.01); *G01S 3/00* (2013.01); *H04N 13/254* (2018.05)

(58) Field of Classification Search
CPC .......................... H04N 13/254; H04N 13/122
USPC .......................................................... 348/480
See application file for complete search history.

(56) References Cited

U.S. PATENT DOCUMENTS

| | | |
|---|---|---|
| 6,522,395 B1 | 2/2003 | Bamji et al. |
| 7,595,827 B2 | 9/2009 | Sato |
| 8,274,037 B2 | 9/2012 | Ritter et al. |
| 8,399,819 B2 | 3/2013 | Madhani et al. |
| 8,482,722 B2 | 7/2013 | Min et al. |
| 8,569,700 B2 | 10/2013 | Bikumandla |
| 8,642,938 B2 | 2/2014 | Bikumandla et al. |
| 8,686,367 B2 | 4/2014 | Shah |

(Continued)

FOREIGN PATENT DOCUMENTS

| | | |
|---|---|---|
| CN | 102004254 A | 4/2011 |
| CN | 102379156 A | 3/2012 |

(Continued)

OTHER PUBLICATIONS

Taiwanese Office Action and Translation dated Oct. 18, 2018, for Taiwanese Application No. 106136489, filed Oct. 24, 2017, 9 pages.

*Primary Examiner* — Mark Hellner  
(74) *Attorney, Agent, or Firm* — Christensen O'Connor Johnson Kindness PLLC (57) ABSTRACT

A time of flight pixel cell includes a photosensor to sense photons reflected from an object and pixel support circuitry. The pixel support circuitry includes charging control logic coupled to the photosensor to detect when the photosensor senses the photons reflected from the object. The pixel support circuitry also includes a controllable current source coupled to provide a charge current in response to a time of flight signal coupled to be received from the charging control logic. A capacitor is coupled to receive the charge current from the controllable current source in response to the time of flight signal, and voltage on the capacitor is representative of a round trip distance to the object. A counter circuit is coupled to the photosensor to count a number of the photons reflected from the object and received by the photosensor.

20 Claims, 8 Drawing Sheets

(56) References Cited

U.S. PATENT DOCUMENTS

| | | | |
|---|---|---|---|
| 9,006,641 B2 | 4/2015 | Drader | |
| 9,312,401 B2 | 4/2016 | Webster | |
| 9,523,765 B2 * | 12/2016 | Sun | ................. G01S 17/105 |
| 2006/0192086 A1 | 8/2006 | Niclass et al. | |
| 2011/0157354 A1 | 6/2011 | Kawahito | |
| 2013/0181119 A1 | 7/2013 | Bikumandla et al. | |
| 2013/0300838 A1 | 11/2013 | Borowski | |
| 2015/0276922 A1 | 10/2015 | Mase et al. | |
| 2016/0010986 A1 | 1/2016 | Sun et al. | |

FOREIGN PATENT DOCUMENTS

| | | | |
|---|---|---|---|
| CN | 103472457 A | 12/2013 |
| TW | 201202731 A | 1/2012 |

\* cited by examiner

TIME OF FLIGHT PHOTOSENSOR

TECHNICAL FIELD

This disclosure relates generally to photosensors, and more specifically relates to reducing error in time of flight measurements.

BACKGROUND INFORMATION

Interest in three dimensional (3D) cameras is increasing as the popularity of 3D applications such as imaging, movies, games, computers, user interfaces, and the like continues to grow. A typical passive way to create 3D images is to use multiple cameras to capture stereo or multiple images. Using the stereo images, objects in the images can be triangulated to create the 3D image. One disadvantage with this triangulation technique is that it is difficult to create 3D images using small devices because there must be a minimum separation distance between each camera in order to create the three dimensional images. In addition, this technique is complex and therefore requires significant computer processing power in order to create the 3D images in real time.

For applications that require the acquisition of 3D images in real time, active depth imaging systems based on optical time of flight measurements are sometimes utilized. Time of flight systems typically employ a light source that directs light at an object, a sensor that detects the light that is reflected from the object, and a processing unit that calculates the distance to the object based on the round trip time that it takes for light to travel to and from the object. In typical time of flight sensors, photodiodes are often used because of the high transfer efficiency from the photo detection regions to the sensing nodes.

A continuing challenge with the acquisition of 3D images is that the required processing must occur very quickly in order for the 3D image acquisition system to resolve time differences on the order of, for example, 0.1 ns for real time applications. With such short response times required for real time applications, sensitivity to noise, jitter, clock signals, heat, etc., in systems that acquire 3D images present increasing challenges as required response times are reduced. Further challenges are also presented when the light that is reflected back from an object is not detected by the sensor of the 3D image acquisition system.

BRIEF DESCRIPTION OF THE DRAWINGS

Non-limiting and non-exhaustive examples of the invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of an apparatus and method for time of flight photosensors are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

As will be shown, examples of a time of flight sensing system including time of flight pixel cells are disclosed. In various examples, time of flight pixel cells in accordance with the teachings of the present invention are oversampled with multiple time of flight measurements between read outs, which reduces the unwanted effects of noise and jitter in the time of flight sensing system. For instance, in one example, hundreds, thousands, or more measurements may be accumulated and then scaled for each read out, which provides increased overall resolution and makes it possible to easily distinguish objects having only slight differences in depth. Furthermore, in various examples, multiple time of flight measurements may also be taken using light pulses that are emitted at varying frequencies that provide measurements having different ranges, which enable compensation for inaccuracies in time of flight measurements that result from reflected photons that are undetected by the photosensors of an example time of flight sensing system in accordance with the teachings of the present invention. Moreover, the systems disclosed here provide a method of correcting inaccuracies in distance measurements resulting from photons that are not absorbed by the photosensor. More specifically, the time of flight measurement may be scaled to reflect the number of photons actually received by the photosensor.

Figure 1A:
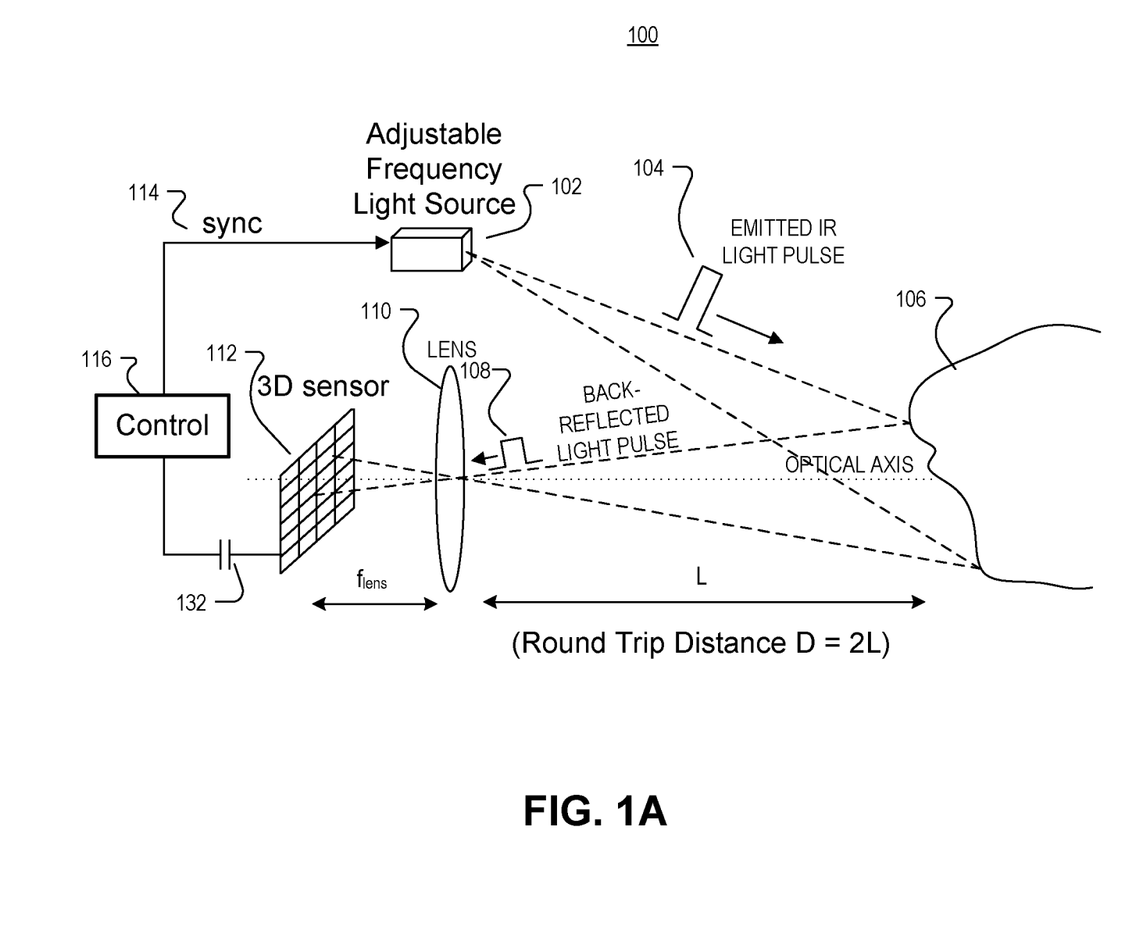
FIG. 1A is a block diagram that shows one example of a time of flight sensing system, in accordance with the teachings of the present invention.

To illustrate, FIG. 1A is a block diagram that shows one example of a time of flight sensing system 100. As shown, time of flight sensing system 100 includes a light source 102 that emits light pulses, which are illustrated as emitted light 104 in FIG. 1A. In the illustrated example, light source 102 is an adjustable frequency light source such that the pulses of emitted light 104 may be emitted at different frequencies. As shown, emitted light 104 is directed to an object 106. In one example, emitted light 104 includes pulses of infrared (IR) light. It is appreciated that in other examples, emitted light 104 may have wavelengths other than infrared, such as for example visible light, near-infrared light, etc., in accordance with the teachings of the present invention. Emitted light 104 is then reflected back from object 106, which is shown as back reflected light 108 in FIG. 1A. As shown, reflected light 108 is directed from object 106 through a lens 110 and is then focused onto a time of flight pixel array 112. In one example, time of flight pixel array 112 includes a plurality of time of flight pixel cells (e.g., avalanche photodiodes) arranged in a two dimensional array. In one example, a sync signal 114 is generated by control circuitry 116 coupled to time of flight pixel array 112, which synchronizes the pulses of emitted light 104 with corresponding signals that control the plurality of pixel cells in time of flight pixel array 112, which sense the reflected light 108, in accordance with the teachings of the present invention.

In the example depicted in FIG. 1A, it is noted that time of flight pixel array 112 is positioned at a focal length $f_{lens}$ from lens 110. As shown in the example, the light source 102 and the lens 110 are positioned a distance L from the object. It is appreciated of course the FIG. 1A is not illustrated to scale and that in one example, the focal length $f_{lens}$ is substantially less than the distance L between lens 110 and object 106. Therefore, it is appreciated that the distance L and the distance L+focal length $f_{lens}$ are substantially equal for purposes of time of flight measurements. In addition, it is also appreciated that for the purposes of this disclosure, the distance between the light source 102 and the object 106, and the distance between the object 106 and the lens 110, are also both substantially equal to L for purposes of time of flight measurements. Accordingly, the distance between the light source 102 and the object 106 (and/or the distance between the object 106 and the lens 110) is equal to half of the round trip distance, e.g., D, which is therefore equal to 2×L. In other words, it is assumed that the distance L from light source 102 to the object 106, plus the distance L back from the object 106 to the lens 110, is equal to the round trip distance D (or 2×L) in accordance with the teachings of the present invention.

In the depicted example, there is a delay time of time of flight (TOF) between the emission of a light pulse of emitted light 104 and the receipt of that light pulse in reflected light 108, which is caused by the amount of time that it takes for the light pulse to travel the distance L from light source 102 to object 106, and then the additional time it takes for the corresponding reflected light pulse 108 to travel the distance L back from object 106 to pixel array 112. The time difference between emitted light 104 and reflected light 108 represents the TOF for the light pulses to make the round trip between light source 102 and object 106. Once the TOF is known, the distance L from light source 102 to object 106 can be determined using the following relationships in Equations 1 and 2 below:

$$TOF=(2\times L)/c \quad (1)$$

$$L=(T_{TOF}\times c)/2 \quad (2)$$

where c is the speed of light, which is approximately equal to $3\times10^8$ m/s, and TOF is the amount of time that it takes for the light pulse to travel to and from the object 106 as shown in FIG. 1A.

Figure 1B:
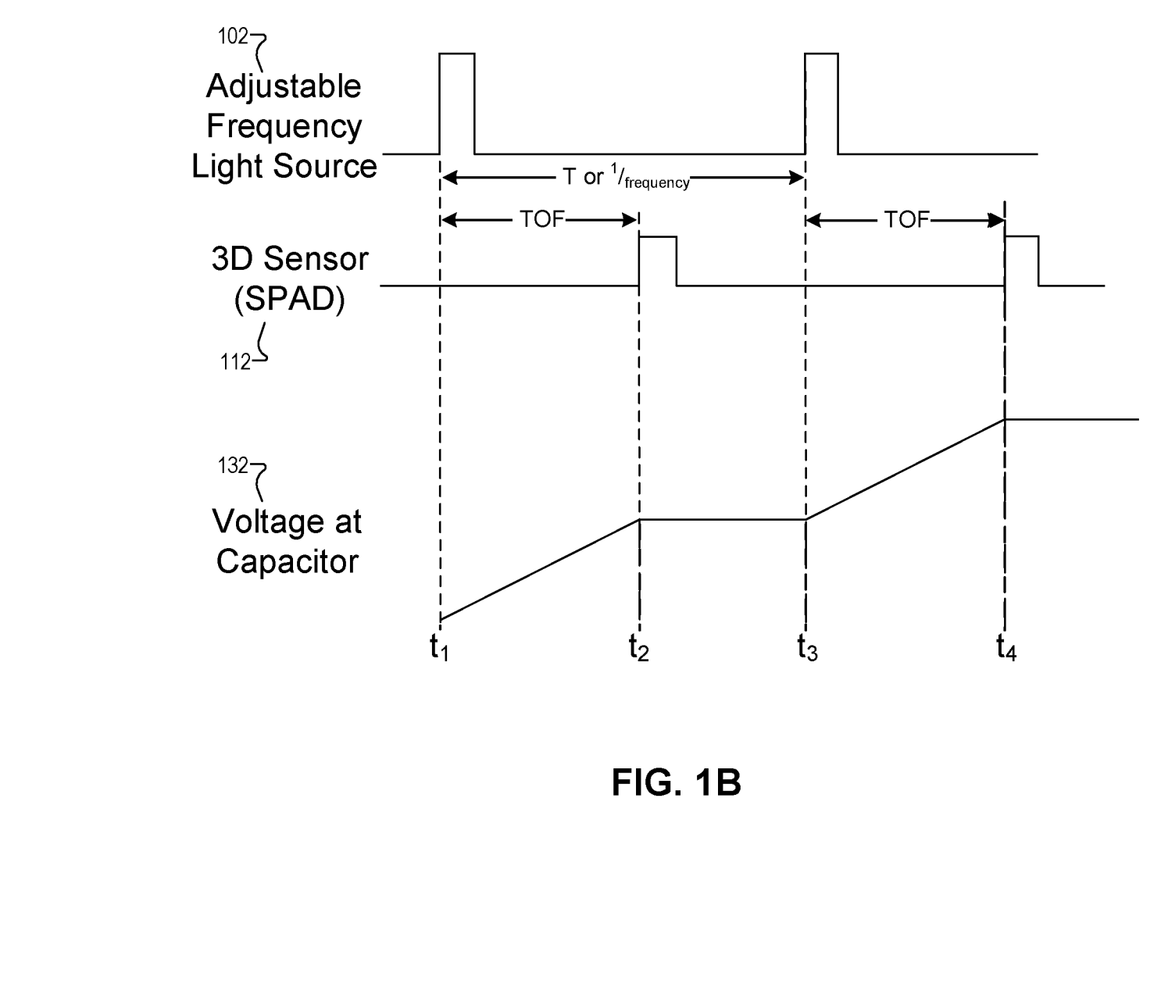
FIG. 1B is a timing diagram that shows an example of emitted light pulses, the respective reflected photons that are sensed by a photosensor, and the corresponding voltage accumulated on a capacitor in an example time of flight pixel, in accordance with the teachings of the present invention.

FIG. 1B is a timing diagram that shows an example of emitted light pulses from an adjustable frequency light source 102, the respective reflected photons that are sensed by a 3D sensor 112, and the corresponding voltage accumulated on a capacitor 132 in an example time of flight pixel. The charge on capacitor 132 corresponds to the TOF since capacitor 132 is charged from the time the light pulse is released to the time when the photosensor absorbs the reflected pulse. It is appreciated that adjustable frequency light source 102 may correspond for example with adjustable frequency light source 102 of FIG. 1A, and that 3D sensor 112 may correspond for example with time of flight pixel array 112 of FIG. 1A. As shown in the illustrated example, light pulses are emitted at time $t_1$ and at time $t_3$. In the example, the period between the emissions of light pulses at time $t_1$ and time $t_3$ is equal to T, which is also equal to 1/frequency that the light pulses are emitted from the light source 102. It is therefore appreciated of course that if the frequency of the emissions of the light pulses is increased, the period of time T between time $t_1$ and time $t_3$ is reduced.

The example depicted in FIG. 1B also illustrates that the 3D sensor 112 detects the photons that are reflected back from the object 106 at time $t_2$ and time $t_4$. Accordingly, the time of flight TOF for the emitted light pulses 104 to travel the round trip distance D back and forth between light source 102 and photosensor 112 is equal to the time between time $t_1$ and $t_2$, and/or the time between $t_3$ and $t_4$ as illustrated in FIG. 1B in accordance with the teachings of the present invention.

The example in FIG. 1B also illustrates that the capacitor 132 is charged when a light pulse 104 is emitted from light source 102 until a reflected photon in back reflected light 108 is detected by sensor 112. After the reflected photon is detected by sensor 112, the capacitor 132 is not charged until the next light pulse 104 is emitted from light source 102. Accordingly, the voltage on capacitor 132 accumulates during the time of flight TOF of the light pulses between time $t_1$ and time $t_2$, and between time $t_3$ and time $t_4$, and there is no accumulation of additional voltage on capacitor 132 between time $t_2$ and time $t_3$, and after time $t_4$ in FIG. 1B.

Figure 1C:
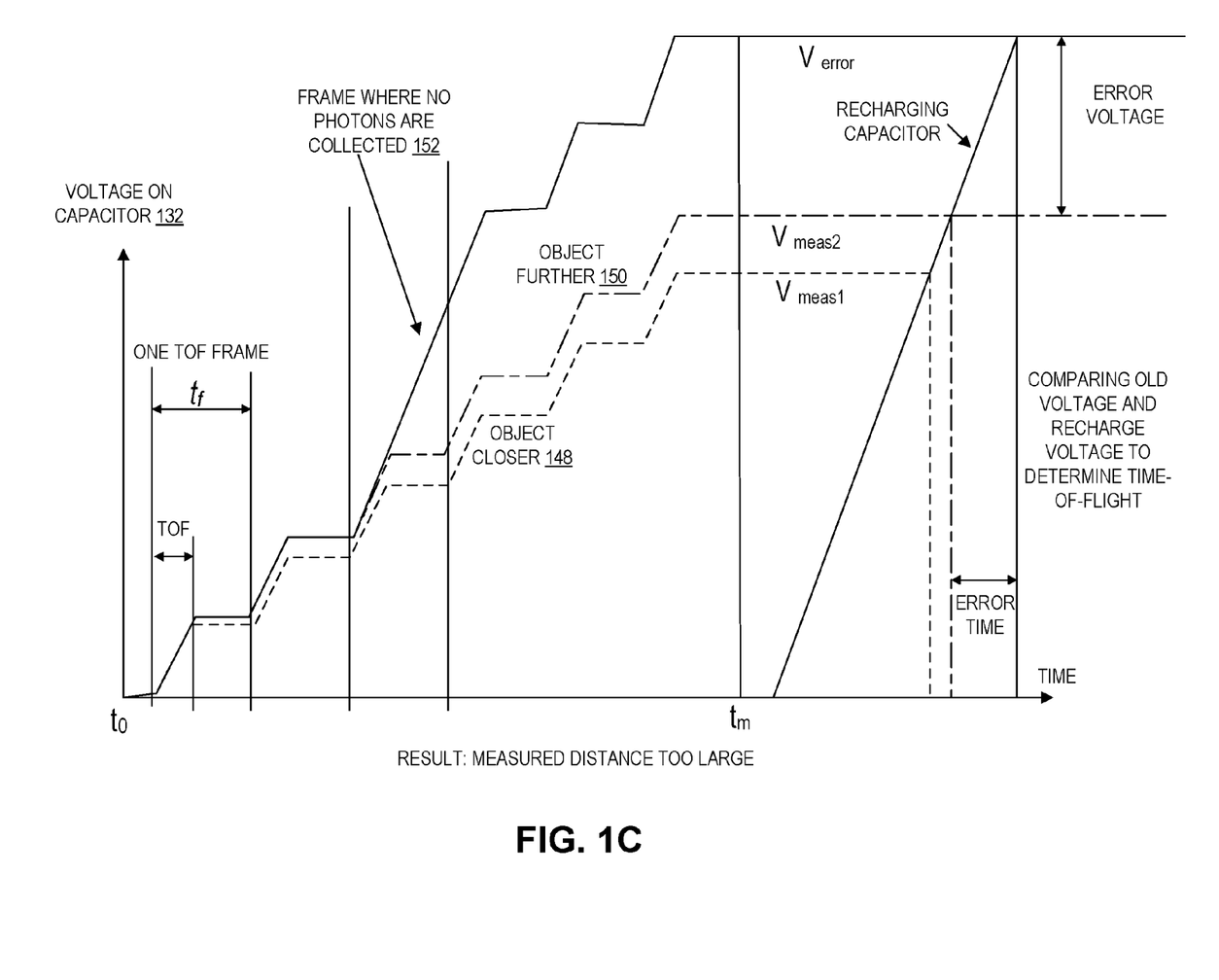
FIG. 1C illustrates a timing diagram that shows an example of the voltage being accumulated on a capacitor during the time of flight of each round trip of a plurality of pulses of light that are emitted from a light source to and from objects, in accordance with the teachings of the present invention.

FIG. 1C is a timing diagram that shows an example of the voltage being accumulated, or oversampled, on capacitor 132 during the time of flight of each round trip of pulses of light that are emitted from a light source to and from objects in accordance with the teachings of the present invention. In the depicted example, the capacitor is initially reset at time $t_0$ to a known voltage, such as for example zero volts. In the example, a plurality of n pulses of light 104 are emitted from light source 102 such that charge on capacitor 132 is accumulated n times for the duration of the time of flight of each one of the light pulses from light source 102 to object 106 and back to sensor 112. In the depicted example, n=6. After the capacitor 132 has been charged or oversampled the n times, the capacitor is then read out at time $t_m$ in accordance with the teachings of the present invention.

In the example shown in FIG. 1C, the graphs for three different time of flight measurements are shown for comparison. In particular, graph 148 shows an example of the voltage on capacitor 132 for n charges for an object that is closer to the photosensor 112, and graph 150 shows an example of the voltage on capacitor 132 for n charges for an object that is farther from the photo sensor 112. As shown in the example, since the voltage on capacitor 132 is accumulated for n charges, the voltages on capacitor 132 are large enough to read out by the time of flight sensing system with a sufficient signal-to-noise ratio. For instance, in the depicted example, the measured voltage $V_{meas1}$ is read out for graph 148 after n charges, and the measured voltage $V_{meas2}$ is read for graph 150 after the n charges. In addition, the example depicted in FIG. 1C shows that when read out, the difference between the voltage measurements $V_{meas1}$ and $V_{meas2}$ for graph 148 and graph 150 are large enough to distinguish the round trip distance differences between the objects of graph 148 and graph 150 in accordance with the teachings of the present invention.

In one example, after the time of flight measurements are read out after the n charges on the capacitor as shown, the measurements may then be scaled to account for the oversampling. For instance, in one example, assuming that a voltage measurement of $V_{meas}$ from the capacitor is read out after the n charges, the measurement $V_{meas}$ may then be scaled by the number of charges, n, to generate an average value for $V_{avg}$ for each time of flight measurement:

$$V_{avg} = V_{meas}/n \qquad (3)$$

where $V_{avg}$ is the average measurement, $V_{meas}$ is the measurement read out from the capacitor after the n charges, and n is the number of times the capacitor was charged for that read out.

The third time of flight measurement depicted by graph 152 shows an example of where the device is trying to measure the distance of an object roughly the same distance away as in graph 150, but several of the light pulses emitted from the device were not received by sensor 112. As shown, this may initiate run-away capacitor charging (steeply increasing portion of graph 152) resulting in a large positive error voltage ($V_{error}$) in capacitor charge. Since capacitor charge is correlated to time of flight and therefore distance, the distance measured in this situation may be too large (even when oversampling is corrected for). This could provide problems for the time of flight sensor. As will be shown, the counter added to each time of flight pixel in FIGS. 2A-2C may be used to correct this issue.

Figure 1D:
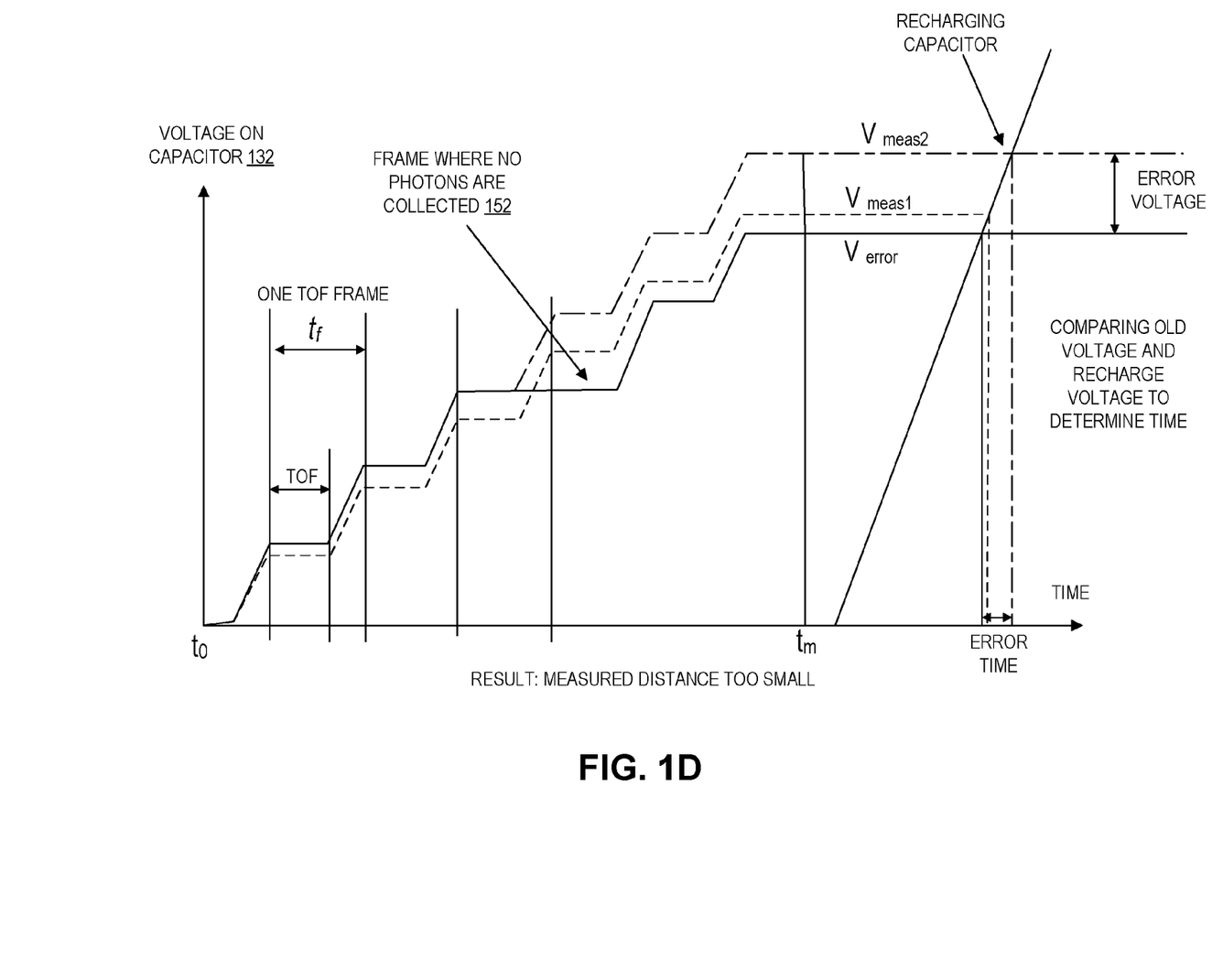
FIG. 1D illustrates a timing diagram that shows an example of the voltage being accumulated on a capacitor during the time of flight of each round trip of a plurality of pulses of light that are emitted from a light source to and from objects, in accordance with the teachings of the present invention.

Similarly, FIG. 1D also illustrates a timing diagram that shows an example of the voltage being accumulated on a capacitor during the time of flight of each round trip of a plurality of pulses (n=6) of light that are emitted from a light source to and from objects in accordance with the teachings of the present invention. Like FIG. 1C, in FIG. 1D graphs for three different time of flight measurements are shown for comparison. In particular, graph 148 shows an example of the voltage on capacitor 132 for n charges for an object that is closer to the photosensor 112, and graph 150 shows an example of the voltage on capacitor 132 for n charges for an object that is farther from the photosensor 112. As shown in the example, since the voltage on capacitor 132 is accumulated for n charges, the voltages on capacitor 132 are large enough to read out by the time of flight sensing system with a sufficient signal-to-noise ratio.

However, unlike FIG. 1C the device in FIG. 1D operates by starting to charge the capacitor when a photon is detected by photosensor 112 (not when a pulse is released by light source 102). Accordingly, in this example, the third time of flight measurement depicted by graph 152 does not experience run-away charging when an emitted light pulse is not received. However, in this embodiment, when a light pulse is not received by sensor 112, the sensor does not charge which results in a lower final voltage on the capacitor. Thus the depicted example results in a negative error in the capacitor charge, with corresponds to an erroneously reduced time of flight measurement, and a subsequently smaller measured distance. As will be shown, the added counter in FIGS. 2A-2C may be used to correct this issue.

Figure 2A:
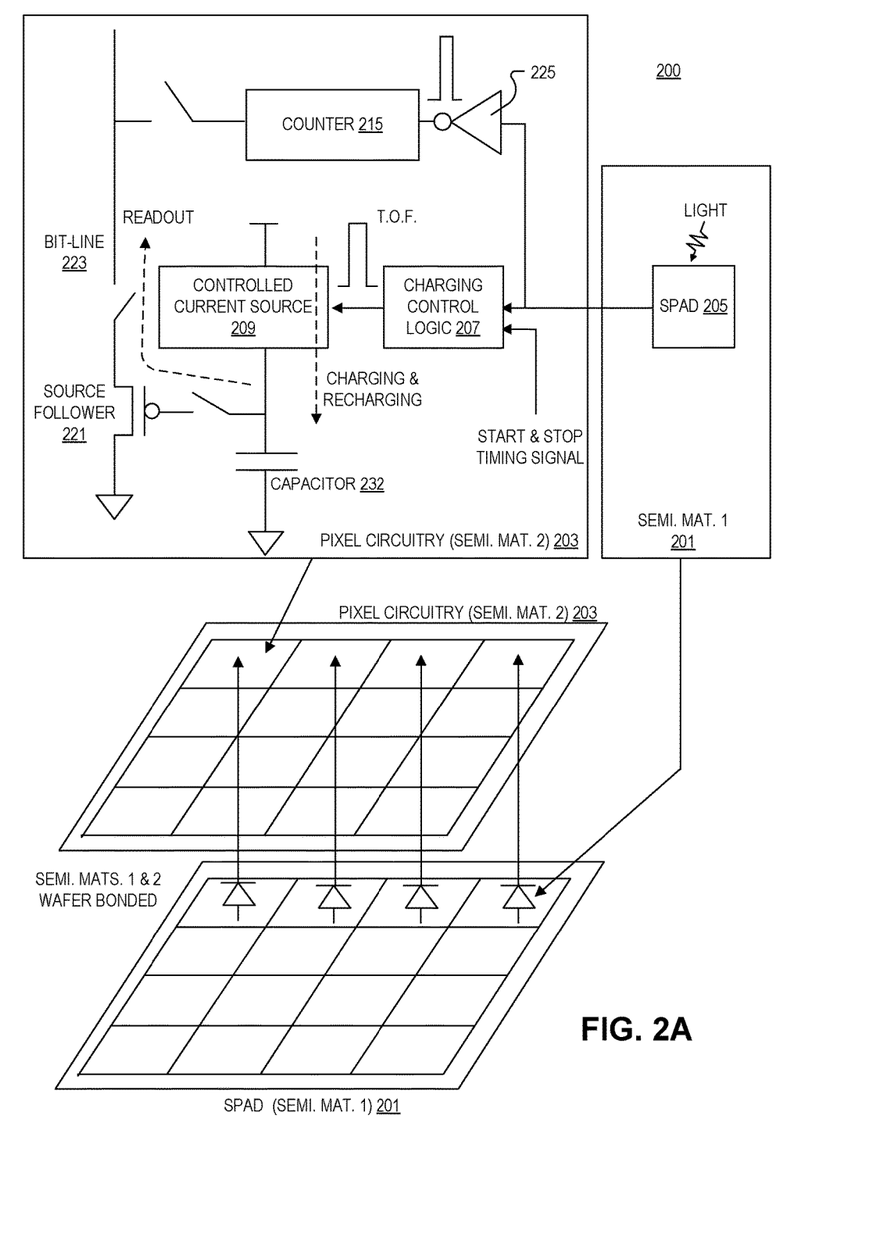
FIG. 2A is a schematic illustrating one example of a time of flight pixel in accordance with the teachings of the present invention.

FIG. 2A is a schematic illustrating one example of a time of flight (TOF) pixel 200 which may be included in the time of flight sensing system of FIG. 1A. TOF pixel 200 includes first semiconductor material 201, second semiconductor material 203 (including pixel circuitry), single photon avalanche photodiode (SPAD) 205, charging control logic 207, controlled current source 209, capacitor 232, inverter 225, counter 215, source follower 221, and bit line 223.

As illustrated a photosensor (SPAD 205) is disposed in first semiconductor material 201 to sense photons reflected from an object, and pixel support circuitry is disposed in second semiconductor material 203. The pixel control circuitry includes charging control logic 207 coupled to the photosensor (SPAD 205) to detect when the photosensor senses the photons reflected from the object (which will result in an output pulse being produced by SPAD 205). Charging control logic 207 is further coupled to receive timing signals (start and stop timing signal) representative of when light pulses are emitted from a light source (e.g. light source 102 from FIG. 1) to the object. Controlled current source 209 is coupled to provide a charge current in response to a time of flight signal coupled to be received from the charging control logic 207; the time of flight signal is representative of a time of flight of each one of the light pulses emitted from the light source traveling to the object and into SPAD 205. Capacitor 232 is coupled to receive the charge current from controlled current source 209 in response to the time of flight signal. The voltage on capacitor 232 is representative of a round trip distance of light from the light source to the object and back to the sensor. Counter circuit 215 is coupled to the photosensor (SPAD 205) to count a number of the photons reflected from the object and received by the photosensor. As shown, inverter 225 may be coupled between counter 215 and SPAD 205. Charge on the capacitor can be sent to readout circuitry via source follower transistor 221 and bitline 223. Similarly, the signal on counter 215 (which includes information about the number of photons received) can be read out along bitline 223 to control logic or may be read out through a separate dedicated line.

In one example, the signal from the counter (including information about the number of the photons received) and the voltage on the capacitor is readout of the pixel support circuitry, and the number of the photons and the voltage on the capacitor is used to calculate a distance from the time of flight pixel cell to the object using the time of flight. As previously shown and discussed in connection with FIGS. 1B-1D the voltage on the capacitor is correlated to the time of flight. However, in this example, the number of the photons counted by counter 215 is used to correct a possible error in the voltage resulting from only a portion of the photons in the light pulses being received by the photosensor (SPAD 205).

In time-of-flight applications, SPADs sensors can measure the distance at which a target is located. When the dark count rate (DCR) of SPAD is low enough, we may exclude the impact of DCR. But there is still the photon detection probability (PDP) that will cause errors in TOF measurements. To reduce noise in time measurement, a large number of frames is needed (F=~1000 frames) to average by accumulation (as shown in the multiple step-like graphs of FIGS. 1C-1D). But due to probabilistic behavior of the photons, the SPAD will not trigger at every frame, and will only breakdown for a smaller number of frames than the total number of frames ($N_{received} < F_{transmitted}$). Thus total time is given by:

$$t_{TOT} = \Sigma_{i=1}^{N} t_i + (F-N) \cdot t_F = N \cdot \overline{t_{TOF}} + (F-N) \cdot t_F \cong F \cdot \overline{t_{TOF}} \quad (4)$$

Where F and N are the number of light pulses output and the number of light pulses received (respectively), $t_{tot}$ is the total time, $t_{tof(bar)}$ is the average time of flight, $t_i$ is the measured TOF in each frame, and $t_f$ is the frame time (e.g., the time computed when no photon is measured).

When the total time measurement is made in analog domain, we need to count (e.g., with counter 215) the number N of frames where photons actually trigger the photodiode to calculate the accurate distance.

$$t_{TOF,meas} = [t_{TOT} - (F-N)t_F]/N \quad (5)$$

This allows for the number of photons (counted by the counter 215) to correct for over/under charging of capacitor 232. Counting received photons produces a more accurate distance measurement than assuming that the number of pulses released from the light source (e.g., light source 102 of FIG. 1A) is the same as the number of pulses collected by SPAD 205 (e.g., sensor 112 of FIG. 1A).

Also depicted in FIG. 2A is that photosensor (SPAD 205) is disposed in first semiconductor material 201 and the pixel support circuitry is disposed in second semiconductor material 203. First semiconductor material 201 is coupled to the second semiconductor material 203. Electrical interconnects extend from first semiconductor material 201 to second semiconductor material 203 to electrically couple the photosensor to the pixel support circuitry. In one example, first semiconductor material 201 is wafer bonded to second semiconductor material 203, and the electrical interconnects extend at least in part through first semiconductor material 201.

Figure 2B:
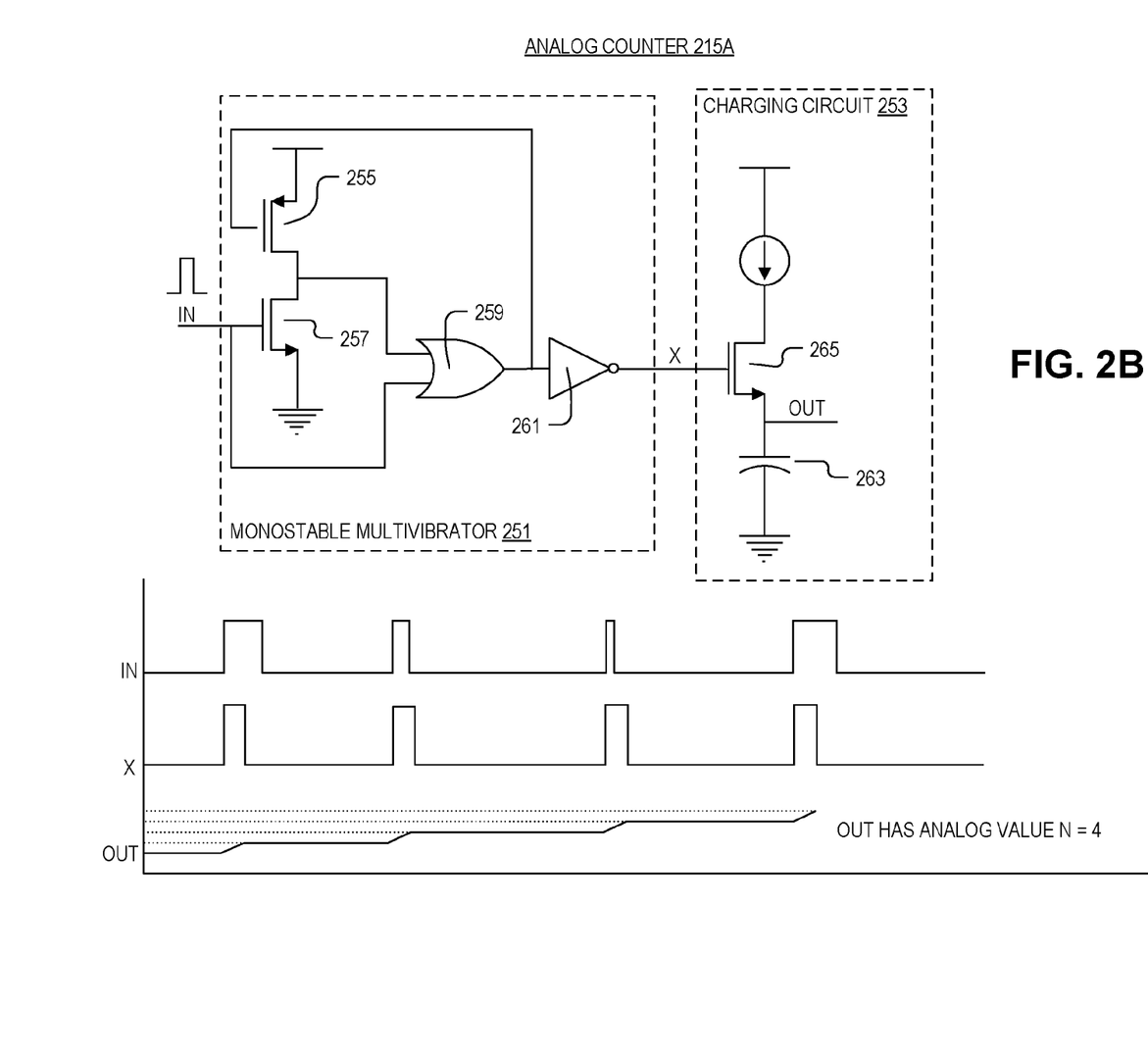
FIG. 2B illustrates an analog example of the counter depicted in FIG. 2A, in accordance with the teachings of the present invention.

FIG. 2B illustrates an analog example of counter 215 depicted in FIG. 2A. As shown, counter circuit 215A includes monostable multivibrator 251 (i.e., a one-shot) and charging circuit 253. The monostable multivibrator 251 includes transistor 255, transistor 257, OR gate 259, and inverter 261. Charging circuit 253 includes transistor 265 and capacitor 263.

In response to the output pulse (IN, from SPAD 205) the monostable multivibrator 251 outputs a logic high signal which is coupled to increase the voltage on capacitor 263 by a fixed amount. As depicted by the timing diagram, the logic high signal has the same pulse width regardless of the input signal. Analog counter receives the logic high signal and is coupled to output a signal with a voltage proportional to a number of photons received by the SPAD 205. As shown in the timing diagram, since the pulse width of the logic high signal is the same every time, the voltage stored on the capacitor increases by a fixed amount with every SPAD pulse. Thus, the signal output from the charging circuit is directly proportional to the number of photons received by the SPAD. In the depicted example, the timing diagram shows receiving four breakdown spikes from the SPAD, each corresponding to an increase in voltage on capacitor 263.

Figure 2C:
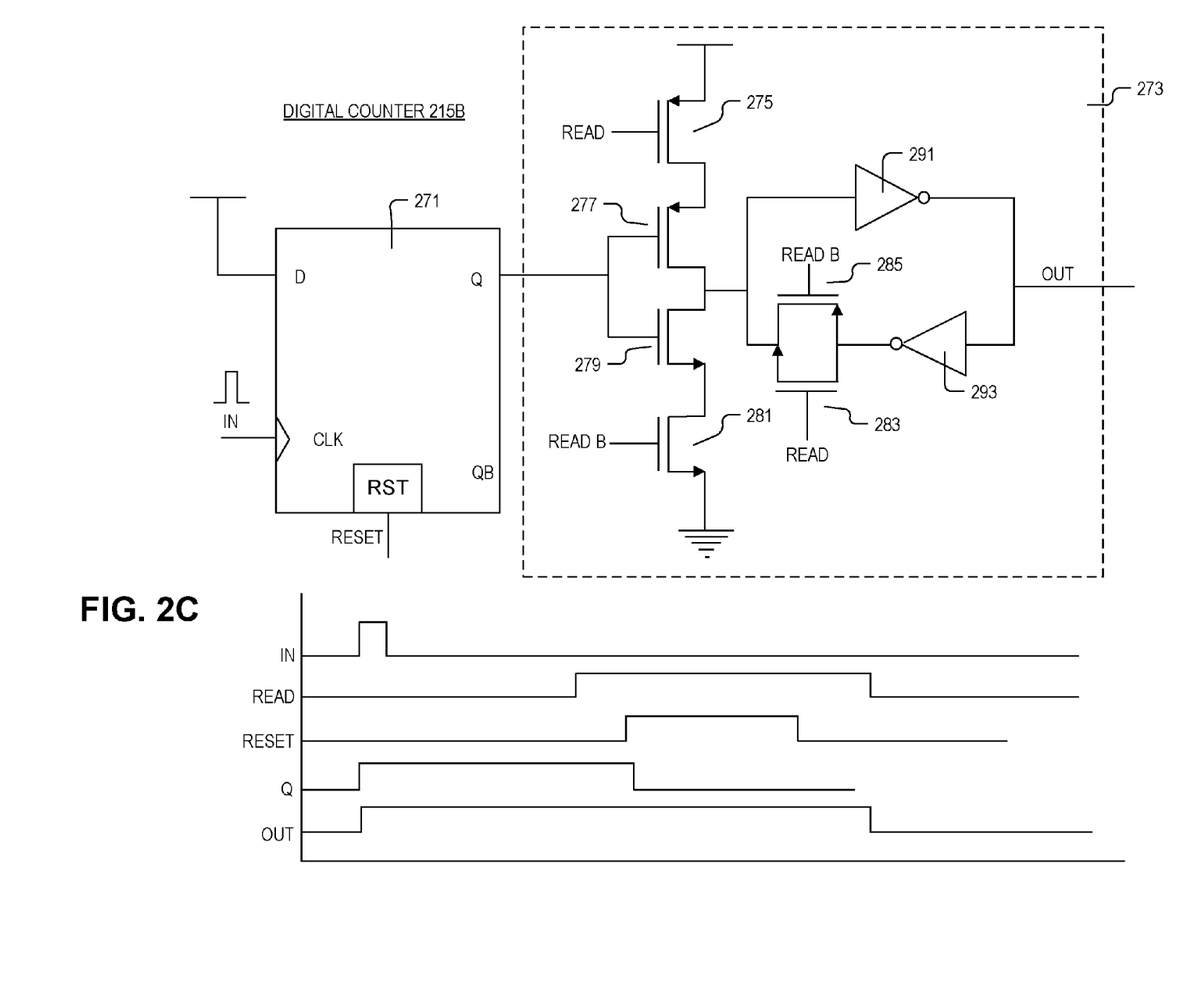
FIG. 2C illustrates a digital example of part of the counter depicted in FIG. 2A, in accordance with the teachings of the present invention.

FIG. 2C illustrates a digital example of part (one bit) of the counter 215 depicted in FIG. 2A. As illustrated, digital counter circuit 215B includes D flip-flop 271 (first latch) with an input coupled to receive the output pulse from a SPAD (e.g., SPAD 205), and a second latch 273 coupled to receive an output signal from D flip-flop 271 and lock that output signal in response to a read signal. D flip-flop 271 receives the output pulse from the SPAD and, as shown in the timing diagram, results in Q going logic-high until D flip-flop 271 receives the reset signal.

Second latch 273 receives this logic high output signal and will lock the logic high signal in response to application of a READ signal. The logic high output signal from D flip-flop 271 is received by an inverter formed from transistors 277 and 279; transistors 277 and 279 are disabled/enabled with transistors 275/281 upon application of READ and READ B signals. Transistors 285/283 in conjunction with inverters 291/293 may maintain the logic high or logic low output signal until it is output; thus latching the output of D flip-flop 271.

Figure 3:
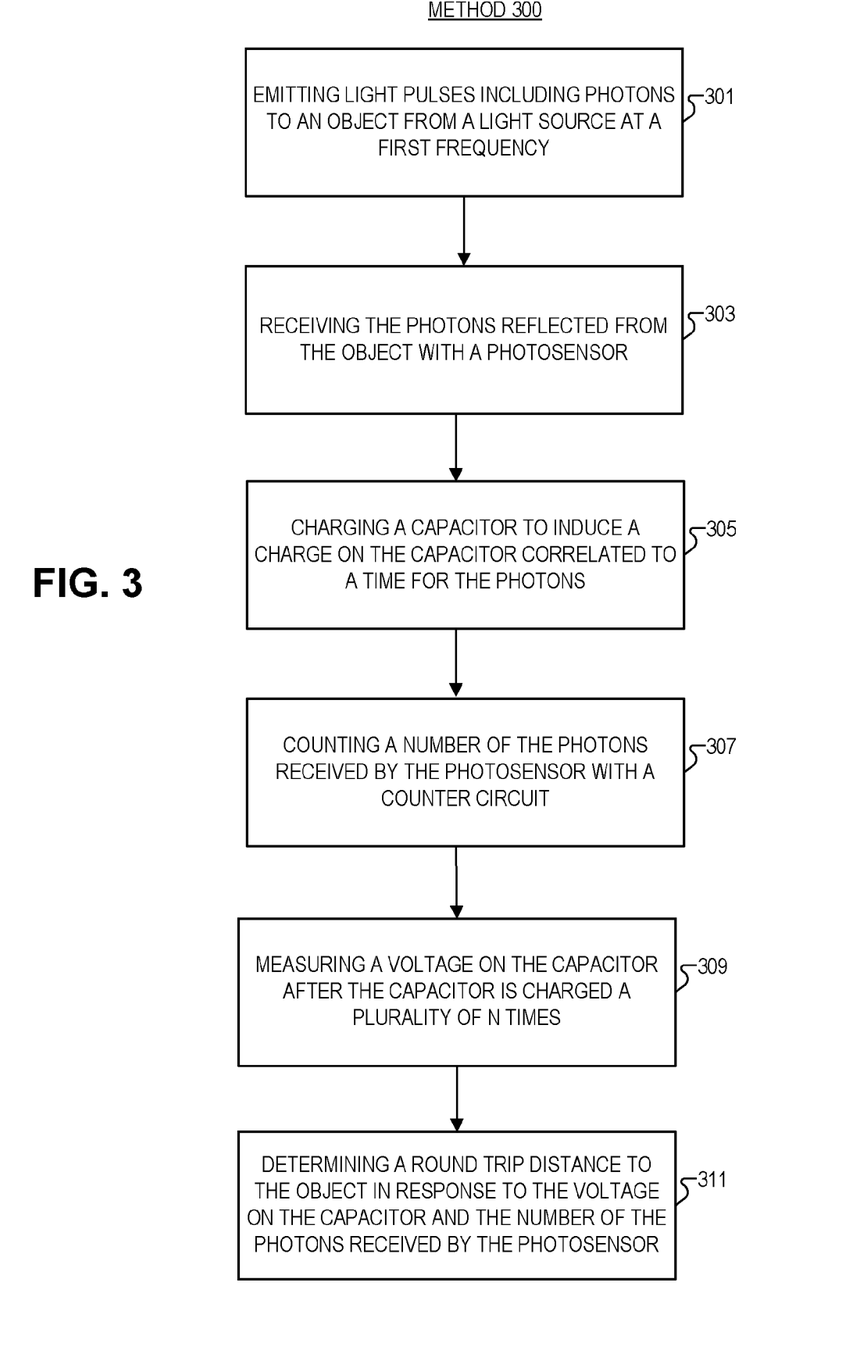
FIG. 3 illustrates a method of determining a round trip distance to an object utilizing time of flight, in accordance with the teachings of the present invention.

FIG. 3 illustrates a method 300 of determining a round trip distance to an object utilizing time of flight. The order in which some or all process blocks appear in method 300 should not be deemed limiting. Rather, one of ordinary skill in the art having the benefit of the present disclosure will understand that some of method 300 may be executed in a variety of orders not illustrated, or even in parallel. Furthermore, method 300 may omit certain process blocks in order to avoid obscuring certain aspects. Alternatively, method 300 may include additional process blocks that may not be necessary in some embodiments/examples of the disclosure.

Block 301 depicts emitting light pulses including photons to an object from a light source at a first frequency. As stated above the emitted photons may be any one of a variety of wavelengths (e.g., IR light, visible light, UV light, or the like).

Block 303 illustrates receiving the photons reflected from the object with a photosensor. In one example, the photosensor includes a plurality of avalanche photodiodes, and the number of the photons counted by the counter increases in response to an output pulse from the avalanche photodiodes.

Block 305 shows charging a capacitor to induce a charge on the capacitor correlated to a time for the photons to travel from the light source to the object and from the object to the photosensor (the time of flight). Charging the capacitor may start when a light pulse is emitted (see e.g., FIG. 1C) or when a light pulse is received (see e.g., FIG. 1D) in accordance with the teachings of the present disclosure.

Block 307 depicts counting a number of the photons received by the photosensor with a counter circuit. As shown in FIGS. 2B & 2C the counter may be implemented as analog or digital logic. One skilled in the art will appreciate that any counter circuit may be used. The counter circuitry may count a received photon once the counter receives an output pulse from an avalanche diode.

Block 309 illustrates measuring a voltage on the capacitor after the capacitor is charged a plurality of n times in response to the light pulses being emitted from the light source at the first frequency. The voltage on the capacitor may be readout by readout circuitry along a bitline.

Block 311 shows determining a round trip distance to the object in response to the voltage on the capacitor and the number of the photons received by the photosensor. This may include calculating the round trip distance from the number of the photons counted and the voltage on the capacitor. The voltage on the capacitor is correlated to the time of flight and, as stated above, the number of counts on the counter may be used to correct an inaccurate voltage on the capacitor resulting from not receiving an emitted photon. In one example, error is reduced by scaling a portion of the signal output from the capacitor to account for the number of the photons received by the photosensor.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A time of flight pixel cell, comprising:
   a photosensor to sense photons reflected from an object in response to light pulses, including the photons, being emitted from a light source toward the object; and
   pixel support circuitry including:
      a controllable current source coupled to provide a charge current in response to a time of flight signal, wherein the time of flight signal is representative of a time of flight of each one of the light pulses emitted from the light source traveling to the object and into the photosensor;
      a capacitor coupled to receive the charge current from the controllable current source in response to the time of flight signal, wherein a voltage on the capacitor is representative of a round trip distance to the object; and
      a counter circuit coupled to the photosensor to count a number of the photons reflected from the object and received by the photosensor, wherein the number of the photons and the voltage are used to calculate a distance from the time of flight pixel cell to the object using the time of flight.

2. The time of flight pixel cell of claim 1, wherein a signal including the number of the photons and the voltage on the capacitor is readout of the pixel support circuitry by readout circuitry, and wherein the voltage on the capacitor is correlated to the time of flight.

3. The time of flight pixel cell of claim 2, wherein the number of the photons is used to correct an error in the voltage resulting from only a portion of the photons in the light pulses being received by the photosensor.

4. The time of flight pixel cell of claim 2, wherein the photosensor includes an avalanche photodiode, and wherein the number of the photons counted increases in response to an output pulse from the avalanche photodiode.

5. The time of flight pixel cell of claim 4, wherein the counter circuit includes an analog counter circuit, and wherein the signal including the number of the photons is a voltage proportional to the number of the photons.

6. The time of flight pixel cell of claim 5, wherein the counter circuit includes a monostable multivibrator and a capacitor, wherein in response to the output pulse the monostable multivibrator outputs a logic high signal which is coupled to increase the voltage on the capacitor by a fixed amount.

7. The time of flight pixel cell of claim 4, wherein the counter circuit is a digital counter circuit to count the number of the photons reflected from the object.

8. The time of flight pixel cell of claim 7, wherein the digital counter circuit includes a D flip-flop with an input coupled to receive the output pulse, and a second latch coupled to receive a logic high signal from the D flip-flop and lock the logic high signal in response to a read signal.

9. The time of flight pixel cell of claim 1, wherein the photosensor is disposed in a first semiconductor material and the pixel support circuitry is disposed in a second semiconductor material, and wherein the first semiconductor material is coupled to the second semiconductor material, and wherein electrical interconnects extend from the first semiconductor material to the second semiconductor material to electrically couple the photosensor to the pixel support circuitry.

10. The time of flight pixel cell of claim 9, wherein the first semiconductor material is wafer bonded to the second semiconductor material, and wherein the electrical interconnects extend at least in part through the first semiconductor material.

11. A method of determining a round trip distance to an object utilizing time of flight, the method comprising:
    emitting light pulses including photons to an object from a light source at a first frequency;
    receiving the photons reflected from the object with a photosensor;
    charging a capacitor to induce a charge on the capacitor correlated to a time for the photons to travel from the light source to the object and from the object to the photosensor;
    counting a number of the photons received by the photosensor with a counter circuit;
    measuring a voltage on the capacitor after the capacitor is charged a plurality of n times in response to the light pulses being emitted from the light source at the first frequency; and
    calculating a round trip distance to the object based on the number of the photons and the voltage on the capacitor.

12. The method of claim 11, further comprising:
    reading a signal including the number of the photons and the voltage on the capacitor by readout circuitry, wherein the voltage on the capacitor is correlated to the time of flight.

13. The method of claim 12, wherein the number of the photons is used to correct an error in the voltage resulting from only a portion of the photons in the light pulses being received by the photosensor.

14. The method of claim 13, wherein error is reduced by scaling a portion of the signal corresponding to the voltage to account for the number of the photons received by the photosensor.

15. The method of claim 12, wherein the photosensor includes an avalanche photodiode, and wherein the number of the photons counted increases in response to an output pulse from the avalanche photodiode.

16. The method of claim 15, wherein counting the number of the photons received by the photosensor with the counter circuit includes using an analog counter circuit, and wherein the signal including the number of the photons includes a voltage proportional to the number of the photons.

17. The method of claim 16, wherein the voltage is stored on a capacitor, wherein the capacitor is coupled to a monostable multivibrator circuit, and wherein in response to the output pulse the monostable multivibrator outputs a logic high signal which is coupled to increase the voltage on the capacitor by a fixed amount.

18. The method of claim 15, wherein counting the number of the photons received by the photosensor includes using a digital counter circuit to count the number of the photons reflected from the object.

19. The method of claim 18, wherein the digital counter circuit includes a D flip-flop with an input coupled to receive the output pulse, and a second latch coupled to receive an output signal from the D flip-flop and lock the output signal in response to a read signal.

20. The method of claim 18, further comprising sending a signal from the photosensor disposed in a first semiconductor material to the counter circuit disposed in a second semiconductor material after receiving the photons reflected from the object with the photosensor.

\* \* \* \* \*